US010575469B2

(12) United States Patent
Underhill

(10) Patent No.: US 10,575,469 B2
(45) Date of Patent: Mar. 3, 2020

(54) NET WRAPPING SYSTEM

(71) Applicant: CNH Industrial America LLC, New Holland, PA (US)

(72) Inventor: Kenneth Underhill, Strasburg, PA (US)

(73) Assignee: CNH Industrial America LLC, New Holland, PA (US)

( * ) Notice: Subject to any disclaimer, the term of this patent is extended or adjusted under 35 U.S.C. 154(b) by 371 days.

(21) Appl. No.: 15/210,145

(22) Filed: Jul. 14, 2016

(65) Prior Publication Data
US 2018/0014466 A1   Jan. 18, 2018

(51) Int. Cl.
*A01F 15/07* (2006.01)
*A01F 15/10* (2006.01)

(52) U.S. Cl.
CPC ........ *A01F 15/071* (2013.01); *A01F 15/0715* (2013.01); *A01F 15/106* (2013.01); *A01F 2015/0725* (2013.01)

(58) Field of Classification Search
CPC ......... B65B 63/04; B65B 41/00; B65B 41/12; B65B 61/06; B65B 11/04; A01F 2015/0745; A01F 15/10; A01F 15/07; A01F 15/071; A01F 15/0715; B65H 37/04; B30B 9/301; Y10S 56/21
USPC .... 53/399, 430, 441, 118, 556, 389.1–389.4, 53/587; 56/343, 21; 100/76–89
See application file for complete search history.

(56) References Cited

U.S. PATENT DOCUMENTS

| | | | |
|---|---|---|---|
| 4,175,673 A | * | 11/1979 | McDonald ......... B65D 83/0805 221/63 |
| 4,956,968 A | | 9/1990 | Underhill |
| 5,036,642 A | | 8/1991 | Underhill |
| 5,140,802 A | | 8/1992 | Inman et al. |
| 5,243,806 A | | 9/1993 | Jennings |
| 5,408,810 A | | 4/1995 | Cullen |
| 6,886,307 B2 | | 5/2005 | Viaud et al. |
| 7,513,008 B2 | | 4/2009 | Vande Ryse |
| 8,065,859 B1 | | 11/2011 | Wingert |
| 2011/0129633 A1 | * | 6/2011 | Andersson ........... B65H 45/101 428/43 |
| 2013/0145724 A1 | | 6/2013 | Roberge et al. |

FOREIGN PATENT DOCUMENTS

| | | | | |
|---|---|---|---|---|
| DE | 102006049139 A1 | * | 4/2008 | ......... A01F 15/0715 |
| EP | 2777381 A1 | | 9/2014 | |
| WO | WO201608946 | * | 6/2016 | ......... A01F 15/0705 |

OTHER PUBLICATIONS

Foreign Patent Documents: DE 102006049139 English Translation of Description and Figures, retrieved from Espacenet on Oct. 4, 2018 (Year: 2018).*

* cited by examiner

*Primary Examiner* — Hemant Desai
*Assistant Examiner* — Amelia Jae-Ippel Vorce
(74) *Attorney, Agent, or Firm* — Patrick M. Sheldrake; Peter K. Zacharias

(57) ABSTRACT

A system and methods for wrapping bales in a harvester uses wrapping material stored in flat, folded layers instead of conventional round tubes or rolls. The system includes a material support tray at least one feed roll, and at least a first tensioning element. The material support tray is capable of supporting at least one bundle of wrapping material. The first tensioning element is positioned adjacent to or in the material support tray and is in operable contact with at least one bundle of wrapping material.

21 Claims, 8 Drawing Sheets

NET WRAPPING SYSTEM

FIELD

The present disclosure relates generally to a system for wrapping bales in a harvester that uses wrapping material stored in flat, folded layers instead of conventional round tubes or rolls, and specifically to a system for storing the wrapping material in the harvester and feeding the wrapping material during the process of wrapping a bale.

BACKGROUND

Agricultural balers have been used for years to consolidate and package crop material to facilitate the storage and handling of the crop material for later use. Usually, a mower-conditioner cuts and conditions the crop material for windrow drying in the sun. When the cut crop material is properly dried, a baler, for example a round baler, travels along the windrows to pick up the crop material and form it into cylindrically-shaped round bales. When a predetermined size is achieved, the cylindrically-shaped round bale is wrapped and bound by wrapping material, such as net wrapping, plastic wrapping, and/or wire. After the round bale is wrapped, the back of the baler, or tailgate, opens and the wrapped bale is discharged.

Conventional balers use wrapping material that is stored as cylindrical tubes known as wrapping material rolls. A wrapping material roll is typically mounted on a baler by a mount or arm that is capable of allowing the wrapping material roll to rotate. Wrapping material from the roll is then fed into a mechanism that applies the material to a completed bale, and is then cut to separate the wrapped bale from the rest of the material.

The conventional methods have several drawbacks. First, the wrapping material rolls are heavy, typically over 100 pounds, and are thus difficult to maneuver by an operator. Second, the cylindrical nature of the rolls makes storage of the wrapping material difficult on a baler, limiting the total amount of wrapping material available, and causing more frequent downtime to reload wrapping material. Third, feeding the wrapping material off of the roll requires power, since the inertia of the roll must be overcome to pull wrapping material off of it every time a new bale needs to be wrapped. Therefor what is needed is a wrapping system that overcomes these drawbacks in order to increase baling efficiency.

SUMMARY

The present disclosure relates to a system comprising a pair of sidewalls attached to a subframe of a harvester, the sidewalls defining a left side and a right side of a bale chamber positioned therebetween; and a wrapping mechanism, comprising: a material support tray, capable of supporting at least one bundle of wrapping material, the bundle of wrapping material comprising one or a plurality of sheets of wrapping material, wherein each sheet is positioned on or within the tray in vertically stacked portions; and wherein each vertically stacked portion of the wrapping material comprises a folded edge defining the edge of the material connecting one portion of the sheet to at least one other sequential portion of the sheet, such that the each vertically stacked portion of the sheet comprises edges that horizontally and vertically align and each folded edge of the portion are on alternating sides of the vertically stacked portion; at least one feed roll, operably connected to the material support tray and configured for dispensing at least one vertically stacked portion of the sheet from at least one of the bundles; and at least a first tensioning element, positioned adjacent to or in the material support tray and in operable contact with at least one bundle of wrapping material, each tensioning element capable of applying at least a first amount of tension to the wrapping material.

In some embodiments, the material support tray comprises a pair of support frame walls, a rear wall, a front wall, and a bottom floor; and wherein the pair of support frame walls, the rear wall, the front wall, and the bottom floor define a storage volume supporting at least one bundle of wrapping material.

In some embodiments, the first tensioning element comprises at least one tension rod and at least one tension arm; wherein, in a first operable position, the first tensioning element applies the first amount of tension to the bundle of wrapping material; and wherein, in a second operable position, the first tensioning element applies a second amount of tension to the at least first tension to the wrapping material, such that the second amount of tension is smaller in magnitude than the first amount of tension allowing at least one portion of at least one sheet to be dispensed by the feed roll.

In some embodiments, the first tensioning element comprises at least one tension rod and at least one tension arm operably attached to the material support tray by at least one pivot point, such tension rod movable in a plurality of radial positions around the pivot point such that, in the first position, the tension rod applies the first amount of tension to the bundle of wrapping material and, in the second operable position, the tension rod applies the second amount of tension to the bundle of wrapping material.

In some embodiments, the wrapping mechanism further comprises a panel accessible to an operator from a point exterior to the subframe, wherein the panel is movable between an open and a closed position; and wherein, in the open position, one or plurality of bundles of wrapping material can be loaded into or unloaded from the material support tray.

In some embodiments, the material support tray further comprises at least one holding rod, positioned vertically within the material support tray. In some embodiments, the material support tray further comprises at least two holding rods, positioned vertically within the material support tray and operably attached to the bottom floor of the material support tray at one end, and wherein the at least two holding rods are capable of passing through the at least one wrapping material bundle placed within the material support tray.

In some embodiments, the system further comprises at least one guide roll, positioned transversely between the pair of sidewalls and configured for receiving wrapping material from the at least one feed roll; at least one feed plate, positioned transversely between the pair of sidewalls adjacent to or substantially adjacent to the bale chamber, and configured for receiving wrapping material from the at least one guide roll; and at least one cutting knife; wherein the position of each of the guide roll, feed plate, and cutting knife are configured for wrapping material from the bundle to be fed by the at least one feed roll to the at least one guide roll, and through the at least one feed plate into the bale chamber.

The present disclosure also relates to a harvester comprising a pair of sidewalls attached to a subframe of the harvester, the sidewalls defining a left side and a right side of a bale chamber positioned therebetween; and a wrapping mechanism, comprising: a material support tray, capable of supporting at least one bundle of wrapping material, the bundle of wrapping material comprising one or a plurality of sheets of wrapping material, wherein each sheet is positioned on or within the tray in vertically stacked portions; and wherein each vertically stacked portion of the wrapping material comprises a folded edge defining the edge of the material connecting one portion of the sheet to at least one other sequential portion of the sheet, such that the each vertically stacked portion of the sheet comprises edges that horizontally and vertically aligned and each folded edge of the portion are on alternating sides of the vertically stacked portion; at least one feed roll, operably connected to the material support tray and configured for dispensing at least one vertically stacked portion of the sheet from at least one of the bundles; and at least a first tensioning element, positioned adjacent to or in the material support tray and in operable contact with at least one bundle of wrapping material, each tensioning element capable of applying at least a first amount of tension to the wrapping material.

The present disclosure also relates to a method of wrapping crop material in a harvester comprising: (a) moving the first tensioning element to a first operable position, wherein the first tensioning element applies a first amount of tension to at least one wrapping material bundle; (b) loading at least one portion of wrapping material from the wrapping material bundle onto at least one feed roll; (c) moving the first tensioning element to a second operable position, wherein the first tensioning element applies a second amount of tension to the at least one wrapping material bundle; and wherein the second amount of tension is smaller in magnitude than the first amount of tension; and (d) dispensing wrapping material from the at least one wrapping material bundle by the at least one feed roll into a bale chamber of the harvester.

In some embodiments, the harvester comprises a material support tray, at least one guide roll, at least one feed plate, and at least one cutting knife; wherein step (a) comprises moving the first tensioning element to a first operable position, wherein the first tensioning element applies a first amount of tension to at least one wrapping material bundle present in the material support tray; wherein step (d) comprises dispensing wrapping material from the at least one wrapping material bundle by the at least one feed roll, to at least one guide roll, and through at least one feed plate into a bale chamber of the harvester.

The present disclosure also relates to a method of loading wrapping material in a harvester comprising physical elements of claim 9, said method comprising: (a) placing, either by automation or manually, at least one bundle of wrapping material in the material support tray; (b) moving the first tensioning element to a first operable position, wherein the first tensioning element applies a first amount of tension to at least one wrapping material bundle present in the material support tray; (c) loading at least one portion of wrapping material from the wrapping material bundle onto at least one feed roll; (d) moving the first tensioning element to a second operable position, wherein the first tensioning element applies a second amount of tension to the at least one wrapping material bundle; and wherein the second amount of tension is smaller in magnitude than the first amount of tension; and (e) dispensing wrapping material from the at least one wrapping material bundle by the at least one feed roll into a bale chamber of the harvester.

In some embodiments, the harvester comprises at least one holding rod positioned in the material support tray; and wherein step (a) further comprises placing at least one wrapping material bundle over at least one holding rod present in the material support tray.

In some embodiments, the method further comprises moving a wrapping mechanism door to an opening position to place at least one wrapping material bundle in the material support tray; and moving a wrapping mechanism door to a closed position to dispense wrapping material from the at least one wrapping material bundle into the bale chamber.

DETAILED DESCRIPTION OF THE DISCLOSURE

Figure 1:
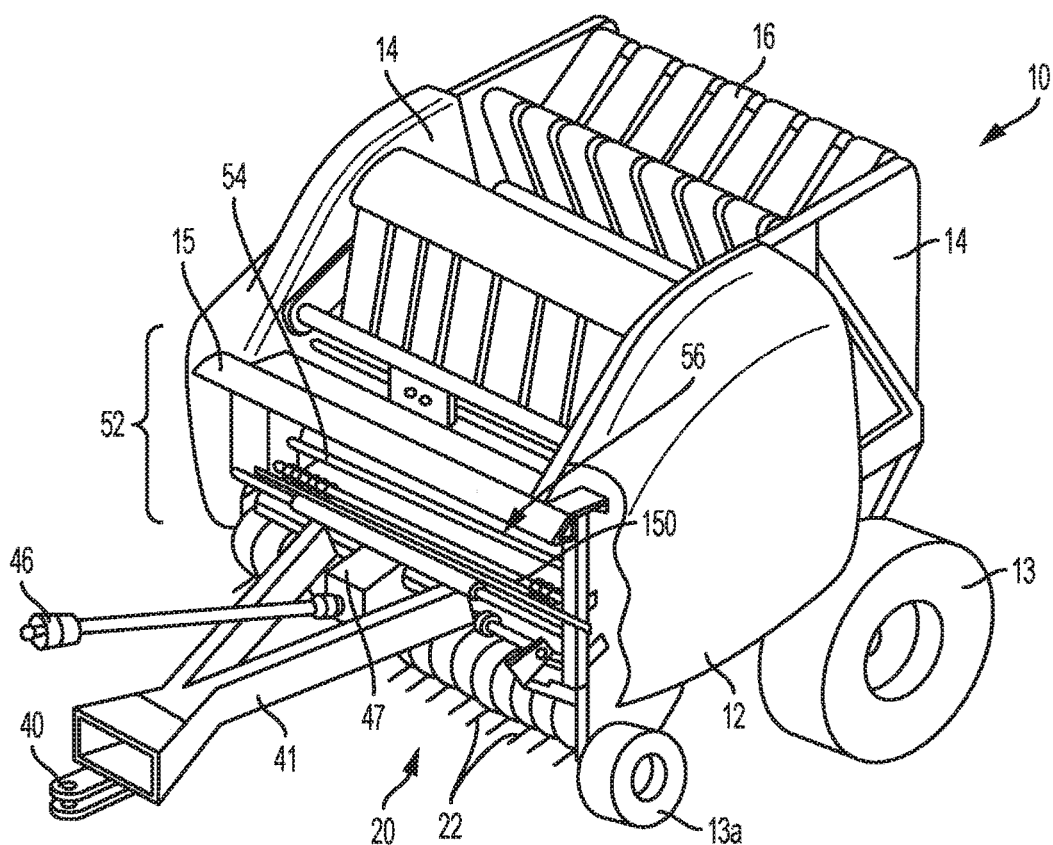
FIG. 1 depicts an image of a conventional harvester.

Various terms relating to the methods and other aspects of the present disclosure are used throughout the specification and claims. Such terms are to be given their ordinary meaning in the art unless otherwise indicated. Other specifically defined terms are to be construed in a manner consistent with the definition provided herein.

As used in this specification and the appended claims, the singular forms "a," "an," and "the" include plural referents unless the content clearly dictates otherwise.

The term "more than 2" as used herein is defined as any whole integer greater than the number two, e.g. 3, 4, or 5.

The term "plurality" as used herein is defined as any amount or number greater or more than 1.

The terms "left" or "right" are used herein as a matter of mere convenience, and are determined by standing at the rear of the machine facing in its normal direction travel. Likewise, "forward" and "rearward" are determined by the normal direction of travel. "Upward" and "downward" orientations are relative to the ground or operating surface as are any references to "horizontal" or "vertical" planes.

The term "about" as used herein when referring to a measurable value such as an amount, a temporal duration, and the like, is meant to encompass variations of ±20%, ±10%, ±5%, ±4%, ±3%, ±2%, ±1%, ±0.5%, or ±0.1% from the specified value, as such variations are appropriate to perform the disclosed methods.

The term "harvester" as used herein is defined as a machine that consolidates and/or packages material so as to facilitate the storage and handling of the material for later use. In some embodiments, the harvester is used to harvest agricultural material. In some embodiments, the harvester is an agricultural baler, a waste baler, cotton harvester or a combine comprising a baling mechanism. In some embodiments, the harvester is a round baler.

The term "crop material" as used herein is defined as a numerous individual items that are harvested or collected by the harvester. In some embodiments, the material is agricultural crop, such as hay or silage. In some embodiments, the material is biomass.

The term "pickup assembly" as used herein is defined as an element responsible for collecting material from the ground over which the harvester operates. A harvesting assembly includes a mechanism to pick up the material from the ground, and such mechanisms are well known in the agricultural industry. Reference is made, for example, to U.S. Patent Application No. US20130305683, which is incorporated herein by reference in its entirety, that illustrates such mechanisms.

As used herein, the term "roll" or "roller" are used interchangeably to mean a substantially cylindrical member that rotates about an axis. In some embodiments, the rolls are components of the serpentine system and run longitudinally and/or transversely across the width of the agricultural harvester or system and support one or a plurality of baling belts that convey harvested crop material in the harvester or system while the harvester or system is in operation.

The term "bale chamber" as used herein is defined as any space within the harvester that is capable of forming a bale of harvested material. In some embodiments, the sides of the bale chamber are defined by oppositely facing side walls and the bottom of the bale chamber is defined by at least one floor roll that spans transverse to the sidewalls and that partially supports the weight of the bale in the bale chamber. In some embodiments, the bale chamber is also defined in its front region by an inlet through which harvested material or crop enters. In some embodiments, the front region of a first bale chamber is defined by an inlet or entry point which is in operable connection to a throat of a crop harvesting assembly, such as a pickup or rotary cutter, and which is defined in a space between the first sidewall, the second sidewall, the bale carrier, and a plurality of rollers positioned between and attached to the first and second sidewalls; wherein the plurality of rollers support one or more baling belts. In some embodiments, at least one, at least two, at least three, or at least four floor rollers extend transverse to the opposite sidewalls along the bottom and front of the bale chamber adjacent to the top and bottom of the entry point. In some embodiments, a bale carrier is positioned in and defines the back of the bale chamber by obstructing an outlet in it fully closed position. In some embodiments, the rollers extending beyond the side walls allow the width of the bale chamber to be selectively increased. In some embodiments, side walls which can be moved laterally, i.e., in the direction of the width of the round baler, that enable making bales of different width or the friction between the walls and bale to be reduced when ejecting the bale. In some embodiments, the top portion of the bale chamber is define by the position of one or more baling belts that wrap around a top portion of the crop material as its rotating in the bale chamber. In some embodiments, the baling belts are mounted on a series of rolls positioned above the bale chamber that exact tension on the bale as it grows.

The term "wrapping mechanism" as used herein is defined as a mechanical device or assembly that uses wrapping material to wrap a formed bale.

The term "wrapping material" as used herein is defined as a net, mesh, twine, plastic film, or other material that is used for the wrapping of a bale in order to maintain the shape and density of said bale and optionally protect it from weather or other external conditions. Wrapping material can be stored in various ways. In some embodiments, wrapping material can be stored in cylindrical rolls, wherein the wrapping material is wrapped around a central core or tube. In some embodiments, wrapping material can be stored as a folded stack or bundle, with oppositely facing folds. In some embodiments, wrapping material stored as a folded bundle comprises one or a plurality of sheets of wrapping material stacked in vertically stacked portions. In some embodiments, each vertically stacked portion of the wrapping material in a wrapping material bundle comprises a folded edge defining the edge of the material connecting one portion of the sheet to at least one other sequential portion of the sheet, such that the each vertically stacked portion of the sheet comprises edges that are horizontally and vertically align and each folded edge of the portion are on alternating sides of the vertically stacked portion. In some embodiments, a wrapping material bundle can consist of one continuously folded wrapping material section. In some embodiments, a wrapping material bundle can consist of two or more operably connected sheets of wrapping material.

The term "cutting implement" or "cutting knife" as used herein is defined as a device involved with the cutting of wrapping material, including one or a plurality of knives, blades, teeth, gears, grinders, scissors, or rotors.

The term "pre-determined size" as used herein is defined as a value which is determined, set, or calculated before the completion of a bale forming cycle, such that, when a bale forming in a bale chamber reaches the value, an event occurs. For example, if the pre-determined size is a specified bale diameter, a harvester may begin a bale wrapping and ejection cycle when bale sensors determine that the forming bale has reached the specified diameter. In some embodiments, the pre-determined size is determined prior to the start of a bale forming cycle. In some embodiments, the pre-determined size is a parameter of diameter, weight, density, moisture content, or position. In some embodiments, the determination of whether a bale has reached the pre-determined size is within the error range of the sensors and controllers involved in the determination. In some embodiments, the determination of whether a bale has reached the predetermined size is within ±10% of the pre-determined size value. In some embodiments, an operator determines the pre-determined size values. In some embodiments, a controller or other software program determines the pre-determined size values. In some embodiments, an operator provides the pre-determined size values via an operator interface that is in electronic communication with one or more controllers. In some embodiments, a combination of an operator and a controller or other software program determines the pre-determined size values.

Many of the fastening, connection, processes and other means and components utilized in this disclosure are widely known and used in the field of the disclosure described, and their exact nature or type is not necessary for an understanding and use of the disclosure by a person skilled in the art, and they will not therefore be discussed in significant detail. Furthermore, the various components shown or described herein for any specific application of this disclosure can be varied and the practice of a specific application of any element may already be widely known or used in the art by persons skilled in the art and each will likewise not therefore be discussed in significant detail.

Agricultural harvesters, such as round balers, are well known in the agricultural industry, and the instant disclosure can be used with substantially any of such machines. Reference is made, for example, to U.S. Pat. Nos. 9,084,394, 8,771,308, 8,733,241, 8,413,414, 8,291,687, 6,877,304; 6,688,092; 6,644,006 and 6,295,797, 5,136,831 and U.S. patent Publication Ser. Nos. 14/316,209, and 14/316,162 that illustrate such harvesters, the disclosures of which are incorporated herein by reference in their entirety. Embodiments of the present disclosure are particularly well suited, but in no way limited to, use with agricultural balers. The present disclosure may also find utility in agricultural harvesters including, for example, a round baler, a waste baler, a cotton harvester, or a combine. In some embodiments, the combine comprises a baling mechanism.

The present disclosure relates to a wrapping system that uses flat, folded stacks, or bundles, of wrapping material instead of cylindrical tubes of wrapping material. Wrapping material bundles are stored in a wrapping material tray, which is attached to a subframe of a harvester. Wrapping material from the wrapping material bundle is fed out of the wrapping material tray by a feed roll and into a feed plate, where the wrapping material can be then applied to a completed bale in a bale chamber. To maintain the correct position and tension in the wrapping material, a tension element, comprising a tension rod and at least one tension arm that connects the tension element to the wrapping material tray, applies a tension to the bundle of wrapping material. The tension applied by the tension element can be varied to control the rate the wrapping material exits the wrapping material bundle in the wrapping material tray. In some embodiments, the tension element applies a first tension to the wrapping material bundle so that wrapping material cannot easily be fed out of the wrapping material tray. In some embodiments, the tension element applies a second tension, smaller in magnitude than the first tension, to the wrapping material bundle so that wrapping material can be fed out of the wrapping material tray in a controlled manner.

Figure 2:
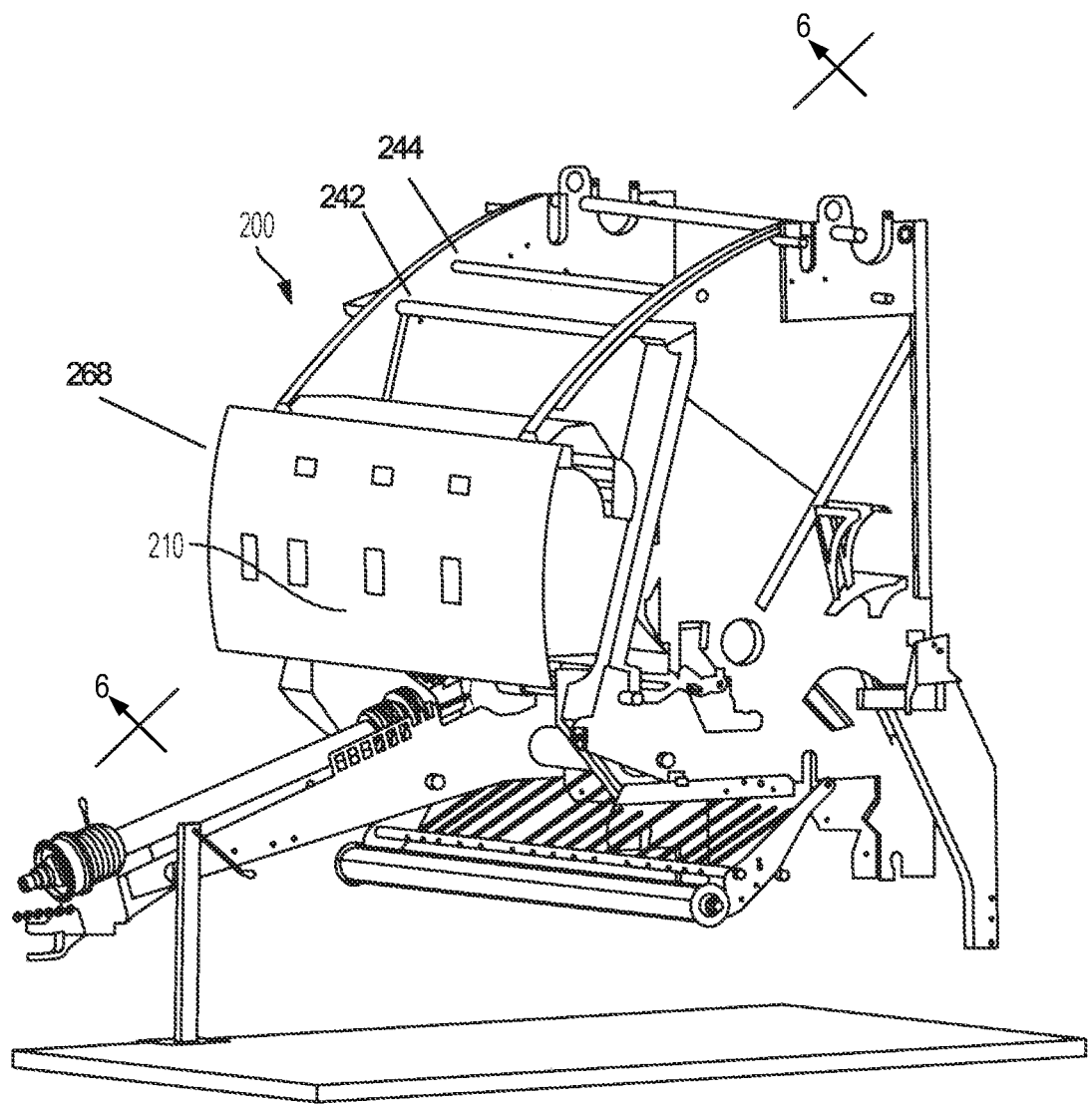
FIGS. 2-5 depict images of a harvester designed to use flat bundles of wrapping material in various positions.

In some embodiments, illustrated in FIG. 2, the wrapping system comprises: a pair of sidewalls 244 attached to a subframe 242 of a harvester 200, the sidewalls 244 defining a left side and a right side of a bale chamber positioned therebetween; and a wrapping mechanism, comprising: a material support tray, capable of supporting at least one bundle of wrapping material, the bundle of wrapping material comprising one or a plurality of sheets of wrapping material, wherein each sheet is positioned on or within the material support tray in vertically stacked portions; and wherein each vertically stacked portion of the wrapping material comprises a folded edge defining the edge of the material connecting one portion of the sheet to at least one other sequential portion of the sheet, such that the each vertically stacked portion of the sheet comprises edges that horizontally and vertically align and each folded edge of the portion are on alternating sides of the vertically stacked portion; at least one feed roll, operably connected to the material support tray and configured for dispensing at least one vertically stacked portion of the sheet from at least one of the bundles; and at least a first tensioning element, positioned adjacent to (FIG. 6B) or in the material support tray and in operable contact with at least one bundle of wrapping material, each tensioning element capable of applying at least a first amount of tension to the wrapping material.

Referring to the figures, FIG. 1 depicts an example of a round baler. The round baler, generally designated 10 is enclosed by a main frame 12, comprising a plurality of rigid structural elements including a pair of side walls 14. Main frame 12 is supported by a pair of rear wheels 13. A forwardly mounted hitch 40, integrated with the main frame 12, provides for connection to a tractor, for examples. As shown, a power take off (PTO) shaft 46, is located herein about the hitch 40. In other balers, the PTO shaft may be located and connected to the tractor below the hitch. The PTO shaft draws energy from a tractor driving the hitch and transfer that energy to drive mechanisms in the baler 10. Rear side 16, typically comprises a tailgate what is closed during bailing and opened to eject finished bales. In conventional balers, storage to house spare rolls of wrapping material is typically located about the tailgate. The front side 15 of the baler faces the rear of a tractor as connected to by the hitch 40 and the PTO shaft 46. At the bottom of the front side, between a front pair of wheels 13a, and mounted to the mainframe 12, is the pickup 20. The pickup 20 is supported by the pair of front wheels 13a. Pickup tines 22 wrap around and connect within the pickup 20. The tips of the tines 22 are movable along a predetermined path along the ground to lift crop material from the ground and deliver it rearward along a generally horizontal path towards a floor roll (not shown) at the bottom of the later, which is rotatably mounted on main frame 12. During baling, the floor roll conveys crop material further rear into a bale chamber where belts then urge the material upwardly and forwardly into engagement with sledge rolls. The sledge rolls coil crop material in a round direction to form and add to a bale acre. Continued feeding by pick tines 22 urge additional crop material into the forming bale in a generally spiral fashion growing the bale core. A wrapping assembly 52 comprises an active roll cavity 54. When the baler is in use, the active roll cavity 54 would house a roll of wrapping material which would spin around a material support cylinder 150 as wrapping material is fed into a feeding entry 56.

Figure 3:
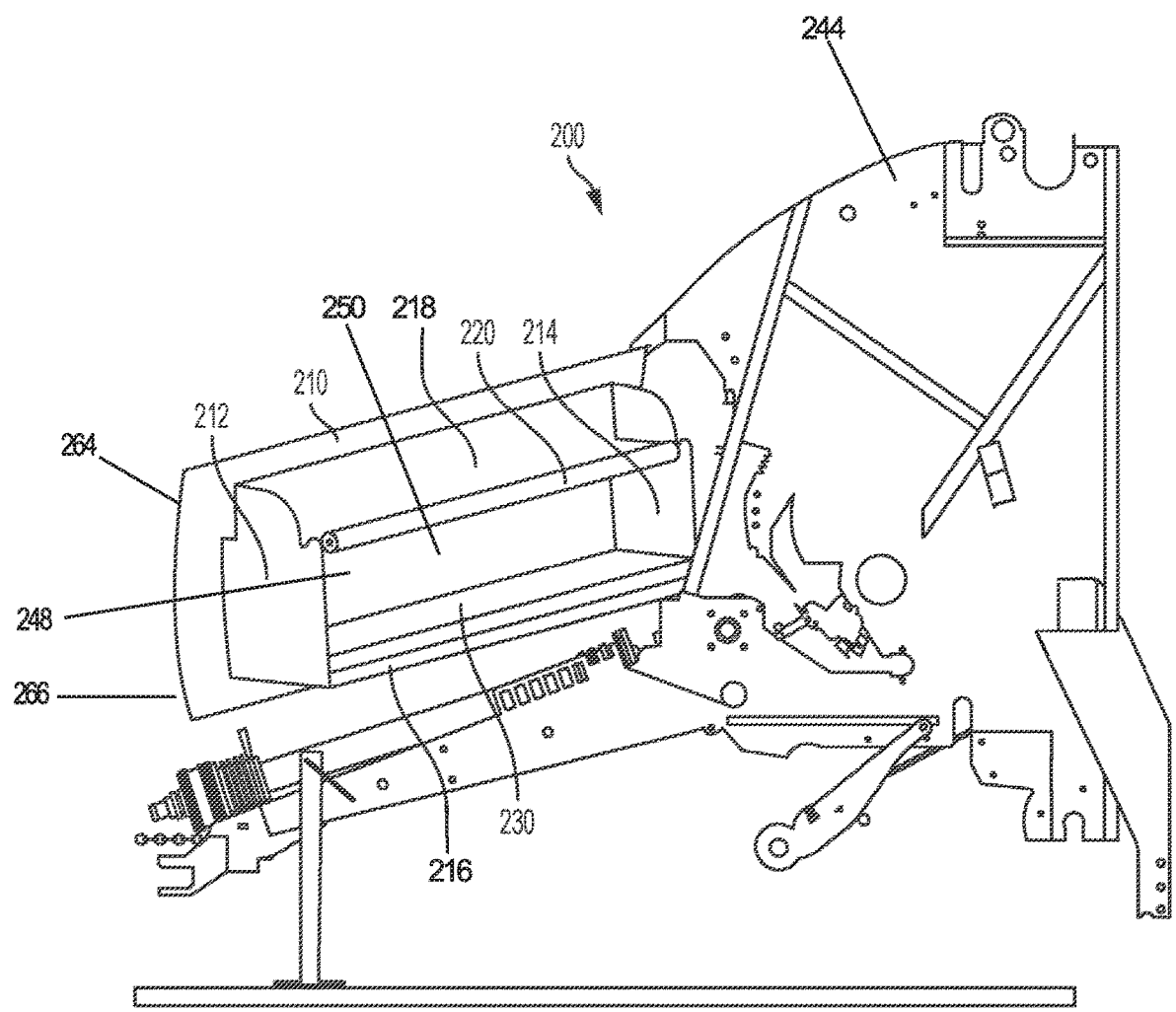
Figure 4:
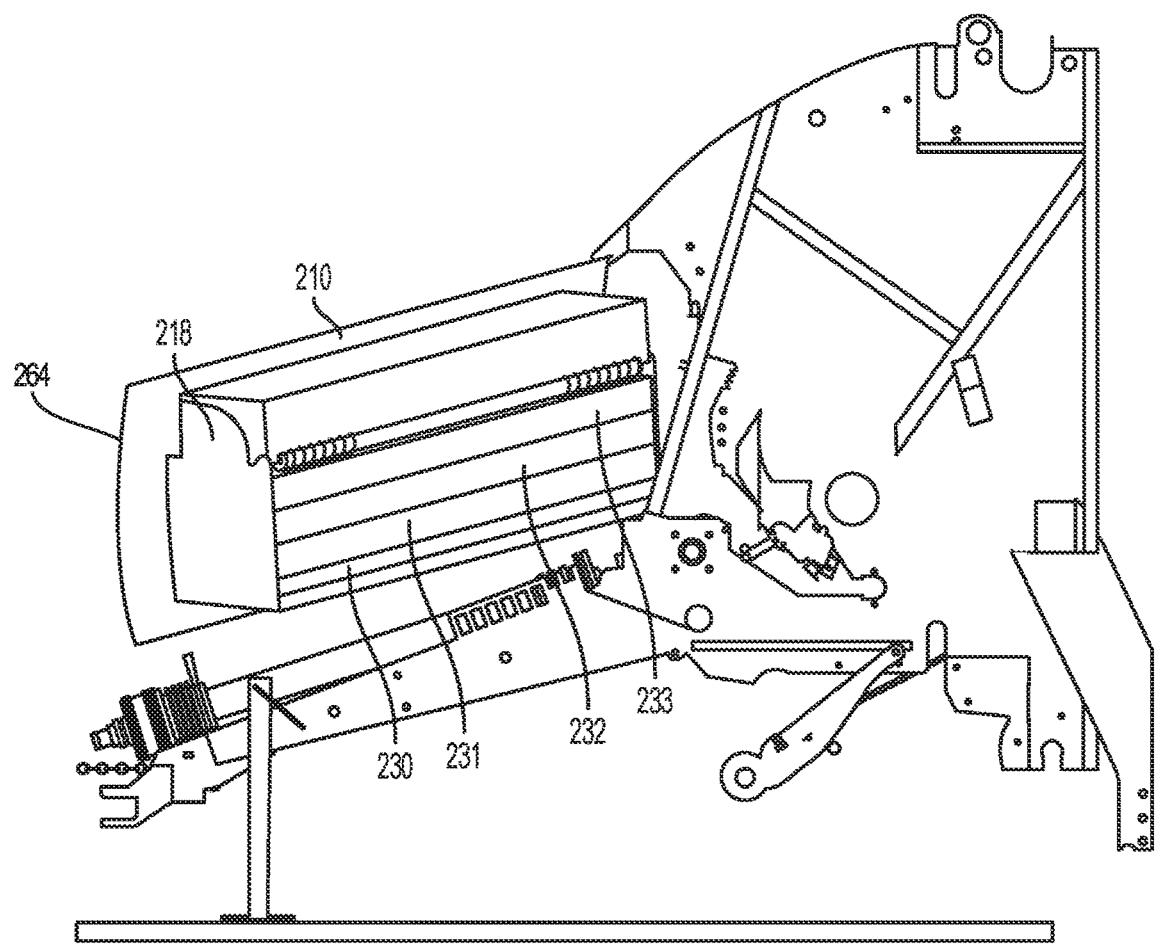
Figure 5:
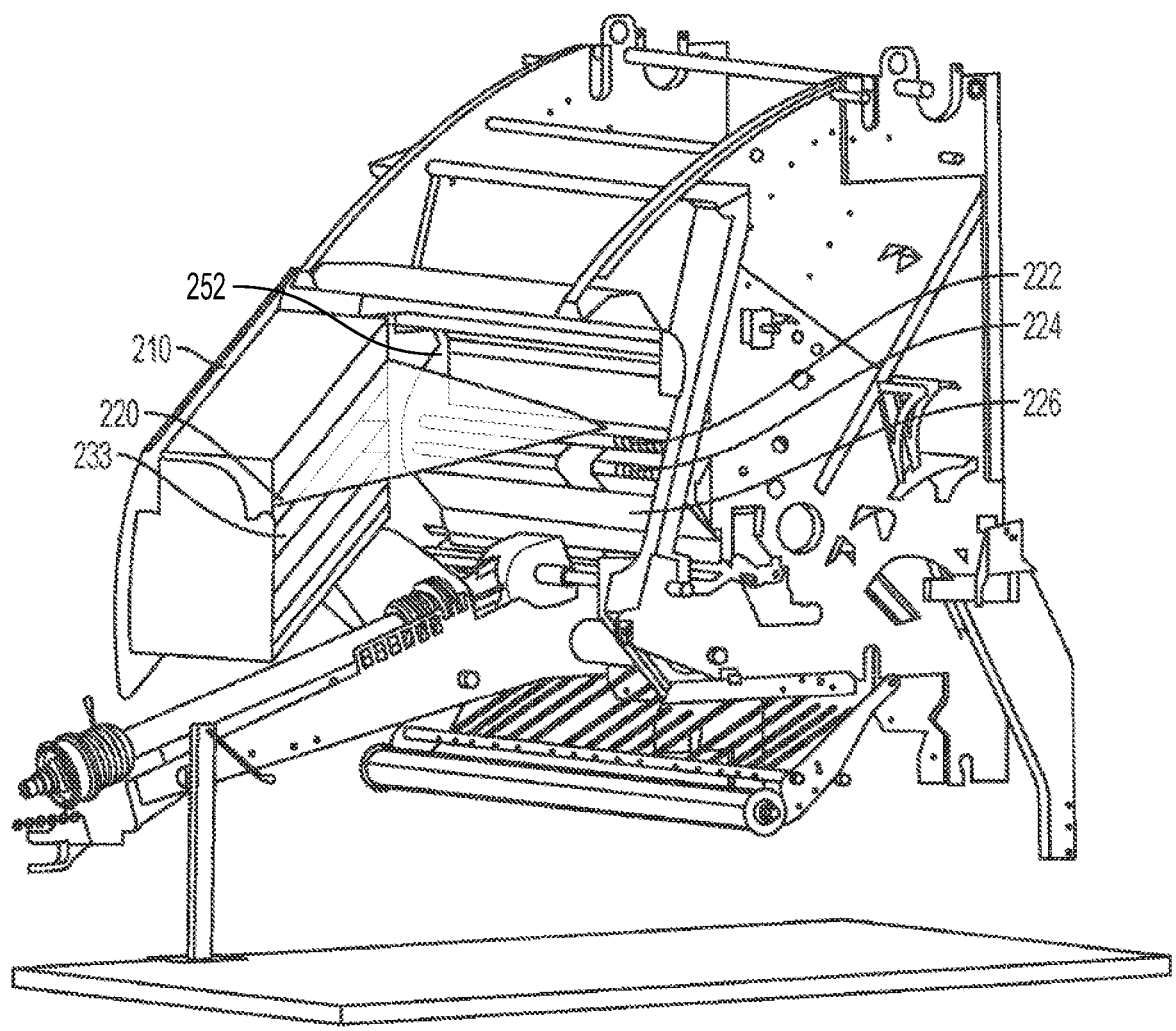

FIGS. 2-6 depict a harvester designed to use flat, folded wrapping material bundles instead of wrapping material rolls. In FIG. 2 the harvester, generally 200, is positioned with the wrapping material tray 210 closed. The wrapping material tray 210 is attached to the subframe 242 of the harvester 200 by a hinge (not shown). In FIG. 3 the wrapping material tray 210 is opened as the harvester 200 is shown from a side view. The wrapping material tray 210 comprises two support frame walls 212 and 214, a rear wall 246, a front wall 248, a bottom floor 216, and upper tray 218, and at least one feed roll 220. One wrapping material bundle 230 is shown in the bottom of the wrapping material tray 210. In FIG. 4, additional wrapping material bundles 231, 232, and 233 are placed in the wrapping material tray 210. In some embodiments, even more wrapping material, such as additional bundles or twine, can be stored in the upper tray 218. In FIG. 5, wrapping material from the top-most wrapping material bundle 233 is fed out of the wrapping material tray 210 by the feed roll 220. The wrapping material is then fed through two guide rolls 222 and 224 before being fed into a feed plate 226. In some embodiments, the feed plate 226 consists of an upper plate and a lower plate. In some embodiments, the feed plate 226 feeds the wrapping material into the bale chamber of the harvester. As shown in FIG. 5, wrapping material is dispensed from the top of the upper wrapping material bundle 233. In some embodiments, the wrapping material is dispensed from the top to the bottom of the wrapping material tray 210. In some embodiments, the wrapping material of the various wrapping material bundles stored in the wrapping material tray 210 are connected, such that the wrapping material continues to be fed into the harvester as one wrapping material bundle ends and the next begins.

In some embodiments, shown in FIG. 3, the material support tray 210 comprises a pair of support frame walls, 212 and 214, a rear wall 246, a front wall 248, and a bottom floor 216; and wherein the pair of support frame walls 212 and 214, the rear wall 246, the front wall 248, and the bottom floor 216 define a storage volume 250 supporting at least one bundle of wrapping material.

Figure 6:
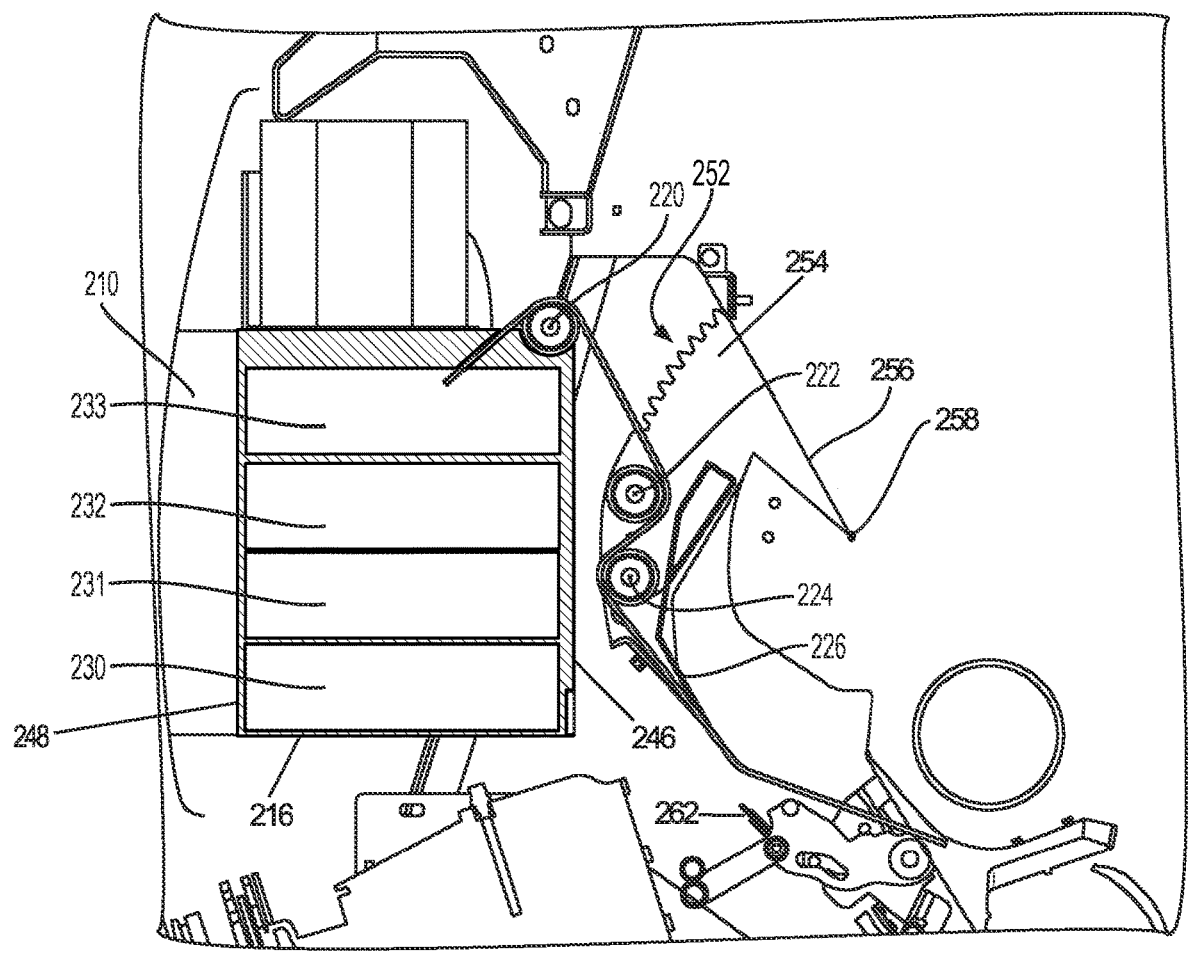
FIG. 6 depicts section 6-6 from FIG. 2 of a wrapping mechanism with flat bundles of wrapping material.

FIG. 6 depicts section 6-6 from FIG. 1 of the wrapping system and harvester. The wrapping material tray 210 is closed and loaded with four bundles of wrapping material 230, 231, 232, and 233. Wrapping material from the upper wrapping material bundle 223 is fed out of the wrapping material tray 210 by the feed roll 220. The wrapping material continues around two guide rolls 222 and 224 and into a feed plate 226. As the wrapping material exits the feed plate 226 it can be applied to a bale (not shown) in the bale chamber. When a bale is finished being wrapped, a knife 262 will cut the wrapping material.

In some embodiments, the wrapping material tray comprises one or more holding rods. The holding rods are designed to pierce the wrapping material bundles so that they stay in place while in the wrapping material tray. In some embodiments, the one or more holding rods are attached the bottom floor of the wrapping material tray. In some embodiments, the one or more holding rods are positioned vertically within the wrapping material tray.

Figure 7:
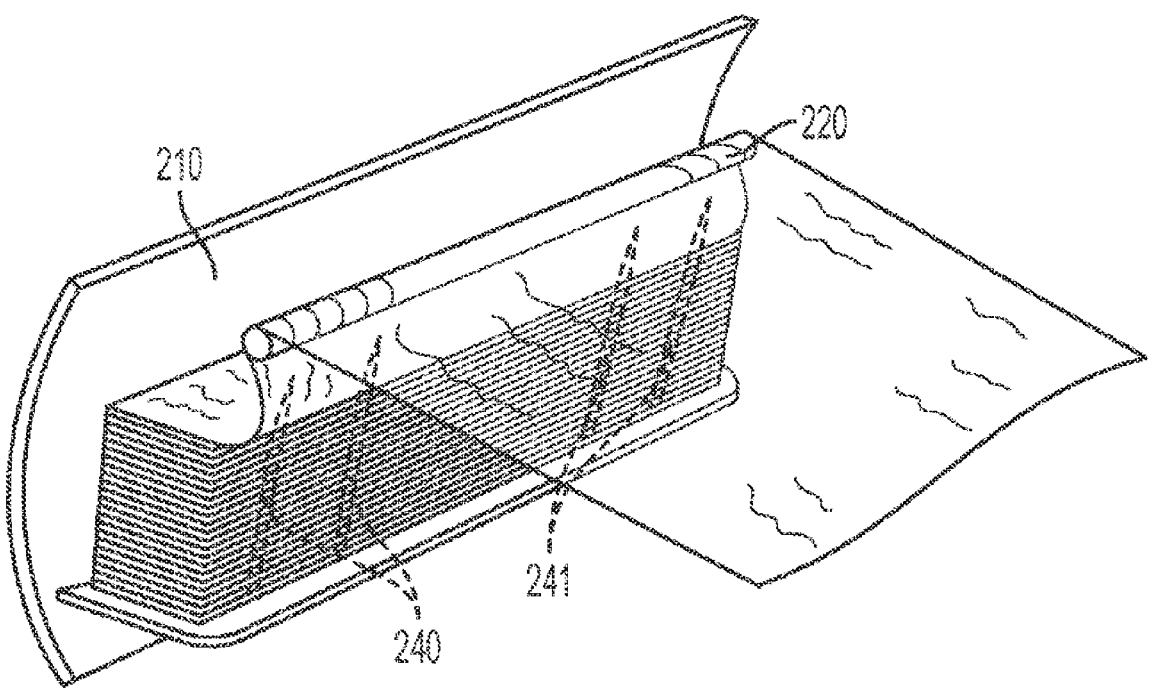
FIG. 7 depicts a wrapping material tray equipped with holding rods.

FIG. 7 depicts a wrapping material tray 210 with two holding rods 240 and 241. Bundles of wrapping material positioned in the wrapping material tray 210 are pierced by the holding rods 240 and 241, such that the bundles will stay in position while wrapping material is fed out by the feed roll 220 and to the rest of the wrapping system.

In some embodiments, the disclosure relates to a method of wrapping a bale in a bale chamber of a harvester using wrapping material stacked in bundles instead of conventional wrapping material rolls. In some embodiments, the method may be used with any of the systems disclosed herein. In some embodiments, the method comprises: (a) moving the first tensioning element to a first operable positions, wherein the first tensioning element applies a first amount of tension to at least one wrapping material bundle; (b) loading at least one portion of wrapping material from the wrapping material bundle onto at least one feed roll; (c) moving the first tensioning element to a second operable position, wherein the first tensioning element applies a second amount of tension to the at least one wrapping material bundle; and wherein the second amount of tension is smaller in magnitude than the first amount of tension; and (d) dispensing wrapping material from the at least one wrapping material bundle by the at least one feed roll into a bale chamber of the harvester.

Figure 6A:
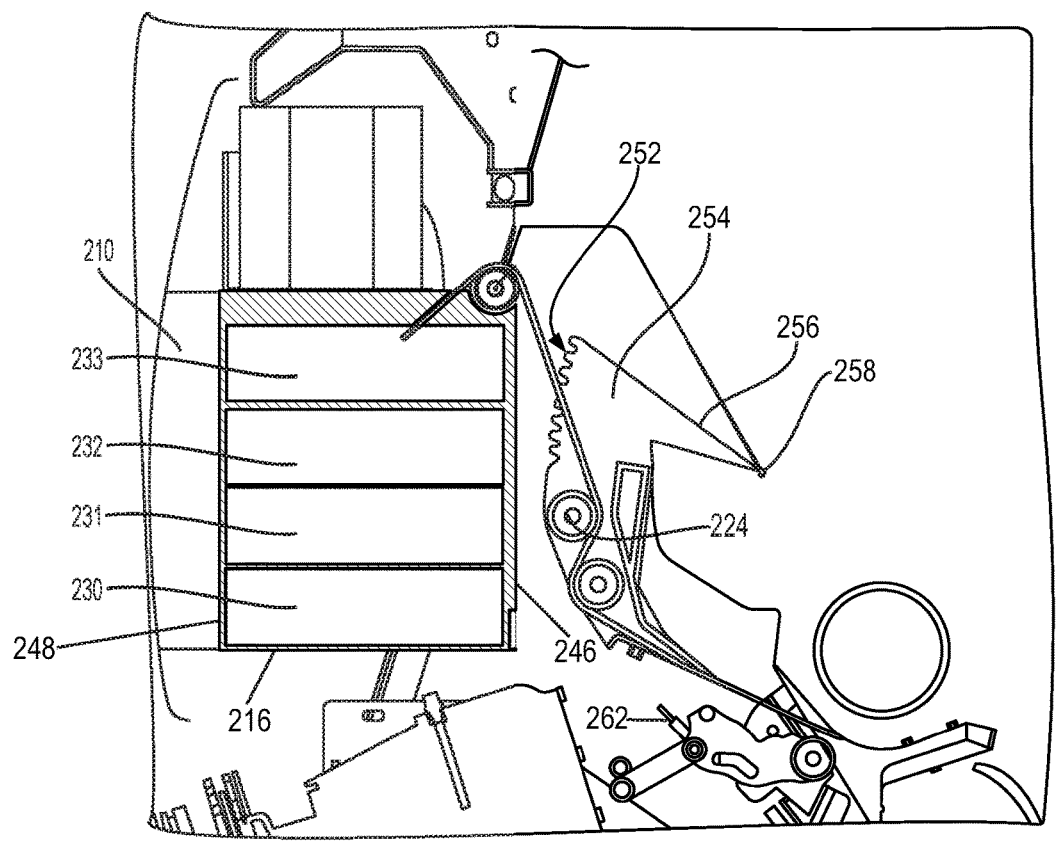
FIG. 6A depicts section 6-6 from FIG. 2 of wrapping the wrapping mechanism showing a first tensioning element.
Figure 6B:
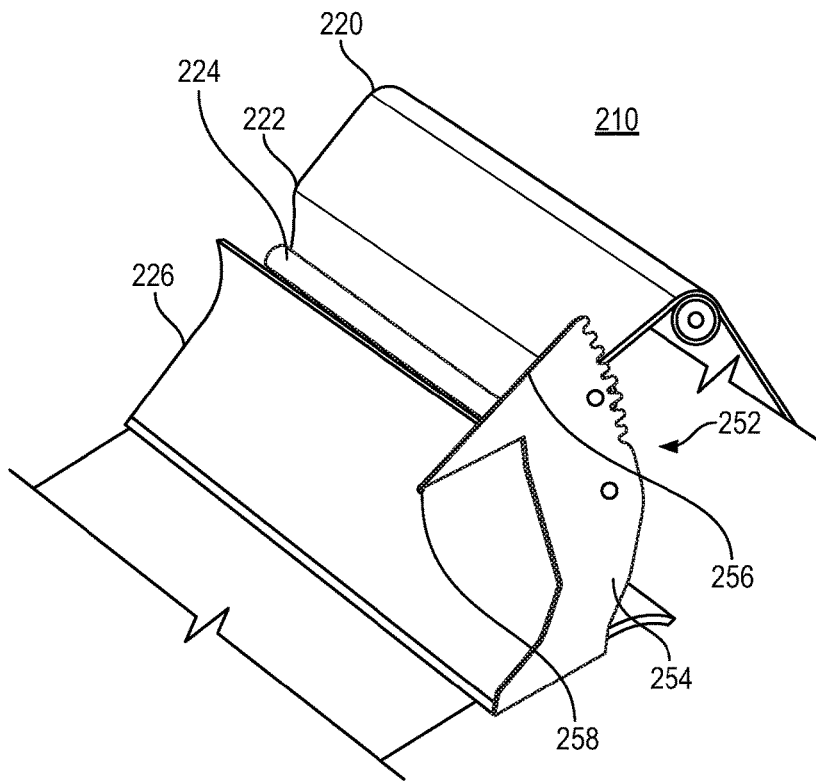
FIG. 6B depicts a portion of the wrapping mechanism showing a tensioning element in operable contact with the wrapping material bundle.

In some embodiments, the first tensioning element 252, shown in FIGs. 6, 6A and 6B, comprises at least one tension rod 254 and at least one tension arm 256 operably attached to the material support tray 210 by at least one pivot point 258, such tension rod 254 movable in a plurality of radial positions (FIGS. 6 and 6A) around the pivot point 258 such that, in the first position (FIG. 6A), the tension rod 254 applies the first amount of tension to the bundle of wrapping material 230 and, in the second operable position (FIG. 6), the tension rod 254 applies the second amount of tension to the bundle of wrapping material 230.

In some embodiments, illustrated in FIG. 2, the wrapping mechanism further comprises a panel 264 accessible to an operator from a point exterior to the subframe 242, wherein the panel is movable between an opened 266 and a closed position 268 (the closed position 268 is illustrated in FIG. 2 and the open position 266 is illustrated in FIG. 3); and wherein, in the opened position, one or plurality of bundles of wrapping material 231, 232 and 233 (show in FIG. 4) can be loaded into or unloaded from the material support tray 210.

In some embodiments, the method comprises: (a) moving the first tensioning element to a first operable position (FIG. 6A), wherein the first tensioning element applies a first amount of tension to at least one wrapping material bundle present in the material support tray; (b) loading at least one portion of wrapping material from the wrapping material bundle onto at least one feed roll; (c) moving the first tensioning element to a second operable position (FIG. 6), wherein the first tensioning element applies a second amount of tension to the at least one wrapping material bundle; and wherein the second amount of tension is smaller in magnitude than the first amount of tension; and (d) dispensing wrapping material from the at least one wrapping material bundle by the at least one feed roll, to at least one guide roll, and through at least one feed plate into a bale chamber of the harvester.

In some embodiments, the method comprises: (a) placing, either by automation or manually, at least one bundle of wrapping material in the material support tray; (b) moving the first tensioning element to a first operable position (FIG. 6A), wherein the first tensioning element applies a first amount of tension to at least one wrapping material bundle present in the material support tray; (c) loading at least one portion of wrapping material from the wrapping material bundle onto at least one feed roll; (d) moving the first tensioning element to a second operable position (FIG. 6), wherein the first tensioning element applies a second amount of tension to the at least one wrapping material bundle; and wherein the second amount of tension is smaller in magnitude than the first amount of tension; and (e) dispensing wrapping material from the at least one wrapping material bundle by the at least one feed roll into a bale chamber of the harvester. In some embodiments, the material support tray comprises at least one holding rod, and the step of placing at least one bundle of wrapping material in the material support tray involves placing at least one wrapping material bundle over at least one holding rod present in the material support tray.

In some embodiments, illustrated in FIG. 3, the method further comprises moving a wrapping mechanism door 264 to an opened position 266 to place at least one wrapping material bundle 230 in the material support tray 210; and moving a wrapping mechanism door 264 to a closed position 268 (shown in FIG. 2) to dispense wrapping material from the at least one wrapping material bundle 230 into the bale chamber.

Having described a series of embodiments, it will become apparent that various modifications can be made without departing from the scope of the disclosure as defined in the accompanying claims. Various publications, including patents, published applications, technical articles and scholarly articles are cited throughout the specification. Each of these cited publications and patent applications is incorporated by reference herein in its entirety.

What is claimed is:

1. A system comprising:
a pair of sidewalls attached to a subframe of a harvester, the sidewalls defining a left side and a right side of a bale chamber positioned therebetween; and
a wrapping mechanism, comprising:
a material support tray, capable of supporting at least one bundle of wrapping material, the bundle of wrapping material comprising one or a plurality of sheets of wrapping material, wherein each sheet is positioned on or within the material support tray in vertically stacked portions; and wherein each vertically stacked portion of the wrapping material comprises a folded edge defining the edge of the material connecting one portion of the sheet to at least one other sequential portion of the sheet, such that the each vertically stacked portion of the sheet comprises edges that are horizontally and vertically aligned and each folded edge of the portion are on alternating sides of the vertically stacked portion;

at least one feed roll, operably connected to the material support tray and configured for dispensing at least one vertically stacked portion of the sheet from at least one of the bundles; and at least a first tensioning element, positioned adjacent to or in the material support tray and in operable contact with at least one bundle of wrapping material, each tensioning element capable of applying at least a first amount of tension to the wrapping material.

2. The system of claim 1, wherein the material support tray comprises a pair of support frame walls, a rear wall, a front wall, and a bottom floor; and wherein the pair of support frame walls, the rear wall, the front wall, and the bottom floor define a storage volume supporting at least one bundle of wrapping material.

3. The system of claim 1, wherein the first tensioning element comprises at least one tension rod and at least one tension arm;

wherein, in a first operable position, the first tensioning element applies the first amount of tension to the bundle of wrapping material; and wherein, in a second operable position, the first tensioning element applies a second amount of tension to the bundle of wrapping material, such that the second amount of tension is smaller in magnitude than the first amount of tension allowing at least one portion of at least one sheet to be dispensed by the feed roll.

4. The system of claim 3, wherein the first tensioning element comprises at least one tension rod and at least one tension arm operably attached to the material support tray by at least one pivot point, such tension rod movable in a plurality of radial positions around the pivot point such that, in the first position, the tension rod applies the first amount of tension to the bundle of wrapping material and, in the second operable position, the tension rod applies the second amount of tension to the bundle of wrapping material.

5. The system of claim 1, wherein the wrapping mechanism further comprises a panel accessible to an operator from a point exterior to the subframe, wherein the panel is movable between an open and a closed position; and wherein, in the open position, one or plurality of bundles of wrapping material can be loaded into or unloaded from the material support tray.

6. The system of claim 1, wherein the material support tray further comprises at least one holding rod, positioned vertically within the material support tray.

7. The system of claim 2, wherein the material support tray further comprises at least two holding rods, positioned vertically within the material support tray and operably attached to the bottom floor of the material support tray at one end, and wherein the at least two holding rods are capable of passing through the at least one wrapping material bundle placed within the material support tray.

8. The system of claim 1, further comprising:
at least one guide roll, positioned transversely between the pair of sidewalls and configured for receiving wrapping material from the at least one feed roll;
at least one feed plate, positioned transversely between the pair of sidewalls adjacent to or substantially adjacent to the bale chamber, and configured for receiving wrapping material from the at least one guide roll; and
at least one cutting knife;
wherein the position of each of the guide roll, feed plate, and cutting knife are configured for wrapping material from the bundle to be fed by the at least one feed roll to the at least one guide roll, and through the at least one feed plate into the bale chamber.

9. A harvester comprising:
a pair of sidewalls attached to a subframe of the harvester, the sidewalls defining a left side and a right side of a bale chamber positioned therebetween; and
a wrapping mechanism, comprising:
a material support tray, capable of supporting at least one bundle of wrapping material, the bundle of wrapping material comprising one or a plurality of sheets of wrapping material, wherein each sheet is positioned on or within the material support tray in vertically stacked portions; and wherein each vertically stacked portion of the wrapping material comprises a folded edge defining the edge of the material connecting one portion of the sheet to at least one other sequential portion of the sheet, such that the each vertically stacked portion of the sheet comprises edges that are horizontally and vertically aligned and each folded edge of the portion are on alternating sides of the vertically stacked portion
at least one feed roll, operably connected to the material support tray and configured for dispensing at least one vertically stacked portion of the sheet from at least one of the bundles; and
at least a first tensioning element, positioned adjacent to or in the material support tray and in operable contact with at least one bundle of wrapping material, each tensioning element capable of applying at least a first amount of tension to the wrapping material.

10. The harvester of claim 9, wherein the material support tray comprises a pair of support frame walls, a rear wall, a front wall, and a bottom floor; and wherein the pair of support frame walls, the rear wall, the front wall, and the bottom floor define a storage volume supporting at least one bundle of wrapping material.

11. The harvester of claim 9, wherein the first tensioning element comprises at least one tension rod and at least one tension arm;
wherein, in a first operable position, the first tensioning element applies the first amount of tension to the bundle of wrapping material; and
wherein, in a second operable position, the first tensioning element applies a second amount of tension to the bundle of wrapping material, such that the second amount of tension is smaller in magnitude than the first amount of tension allowing at least one portion of at least one sheet to be dispensed by the feed roll.

12. The harvester of claim 9, wherein the first tensioning element comprises at least one tension rod and at least one tension arm operably attached to the material support tray by at least one pivot point, such tension rod movable in a plurality of radial positions around the pivot point such that, in the first position, the tension rod applies the first amount of tension to the bundle of wrapping material and, in the second operable position, the tension rod applies the second amount of tension to the bundle of wrapping material.

13. The harvester of claim 9, wherein the wrapping mechanism further comprises a panel accessible to an operator from a point exterior to the subframe, wherein the panel is movable between an open and a closed position; and
wherein, in the open position, one or plurality of bundles of wrapping material can be loaded into or unloaded from the material support tray.

14. The harvester of claim 9, wherein the material support tray further comprises at least one holding rod, positioned vertically within the material support tray.

15. The harvester of claim 10, wherein the material support tray further comprises at least two holding rods, positioned vertically within the material support tray and operably attached to the bottom floor of the material support tray at one end, and wherein the at least two holding rods are capable of passing through the at least one wrapping material bundle placed within the material support tray.

16. The harvester of claim 9, further comprising:
at least one guide roll, positioned transversely between the pair of sidewalls and configured for receiving wrapping material from the at least one feed roll;
at least one feed plate, positioned transversely between the pair of sidewalls adjacent to or substantially adjacent to the bale chamber, and configured for receiving wrapping material from the at least one guide roll; and
at least one cutting knife;
wherein the position of each of the guide roll, feed plate, and cutting knife are configured for wrapping material from the bundle to be fed by the at least one feed roll to the at least one guide roll, and through the at least one feed plate into the bale chamber.

17. The harvester of claim 9, wherein the material support tray comprises a pair of support frame walls, a rear wall, a front wall, and a bottom floor;
wherein the pair of support frame walls, the rear wall, the front wall, and the bottom floor define a storage volume supporting at least one bundle of wrapping material;
wherein the first tensioning element comprises at least one tension rod and at least one tension arm;
wherein, in a first operable position, the first tensioning element applies the first amount of tension to the bundle of wrapping material;
wherein, in a second operable position, the first tensioning element applies a second amount of tension to the at least first tension to the wrapping material, such that the second amount of tension is smaller in magnitude than the first amount of tension allowing at least one portion of at least one sheet to be dispensed by the feed roll; and
wherein the harvester further comprises:
at least one guide roll, positioned transversely between the pair of sidewalls and configured for receiving wrapping material from the at least one feed roll;
at least one feed plate, positioned transversely between the pair of sidewalls adjacent to or substantially adjacent to the bale chamber, and configured for receiving wrapping material from the at least one guide roll; and
at least one cutting knife;
wherein the position of each of the guide roll, feed plate, and cutting knife are configured for wrapping material from the bundle to be fed by the at least one feed roll to the at least one guide roll, and through the at least one feed plate into the bale chamber.

18. A method of loading wrapping material in a harvester of claim 9, said method comprising:
(a) placing, either by automation or manually, at least one bundle of wrapping material in the material support tray;
(b) loading at least one portion of wrapping material from the wrapping material bundle onto at least one feed roll; and
(c) dispensing wrapping material from the at least one wrapping material bundle by the at least one feed roll into the bale chamber of the harvester.

19. The method of claim 18, wherein the harvester further comprises at least a first tensioning element, positioned adjacent to or in the material support tray and in operable contact with at least one bundle of wrapping material, each tensioning element capable of applying at least a first amount of tension to the wrapping material, said method comprising:
(a) placing, either by automation or manually, at least one bundle of wrapping material in the material support tray;
(b) moving the first tensioning element to a first operable position, wherein the first tensioning element applies a first amount of tension to at least one wrapping material bundle present in the material support tray;
(c) loading at least one portion of wrapping material from the wrapping material bundle onto at least one feed roll;
(d) moving the first tensioning element to a second operable position, wherein the first tensioning element applies a second amount of tension to the at least one wrapping material bundle; and wherein the second amount of tension is smaller in magnitude than the first amount of tension; and
(e) dispensing wrapping material from the at least one wrapping material bundle by the at least one feed roll into a bale chamber of the harvester.

20. The method of claim 18, wherein the harvester comprises at least one holding rod positioned in the material support tray; and wherein step (a) further comprises placing at least one wrapping material bundle over at least one holding rod present in the material support tray.

21. The method of claim 18, further comprising moving a wrapping mechanism door to an opened position to place at least one wrapping material bundle in the material support tray; and moving the wrapping mechanism door to a closed position to dispense wrapping material from the at least one wrapping material bundle into the bale chamber.

* * * * *